United States Patent [19]
Warner et al.

[11] Patent Number: 4,904,114
[45] Date of Patent: Feb. 27, 1990

[54] FISH CONVEYING APPARATUS

[75] Inventors: Joseph Warner; James Schjelderup, both of Vancouver, Canada

[73] Assignee: Warner Technologies, Inc., Vancouver, Canada

[21] Appl. No.: 245,988

[22] Filed: Sep. 14, 1988

[30] Foreign Application Priority Data

Sep. 15, 1987 [CA] Canada .................................. 546891

[51] Int. Cl.⁴ .............................................. F02B 8/08
[52] U.S. Cl. ......................................... 405/82; 405/80
[58] Field of Search ............................. 405/81, 82, 83

[56] References Cited

U.S. PATENT DOCUMENTS

| 1,591,450 | 7/1926 | Wheeler | 405/82 |
| 1,680,722 | 8/1928 | Bennett et al. | 405/82 |
| 2,089,142 | 8/1937 | Waters | 405/82 |
| 2,102,629 | 12/1937 | Knerr | 405/82 |
| 2,119,540 | 6/1938 | Holmes et al. | 405/82 |
| 3,377,805 | 4/1968 | Warner | 405/81 |
| 3,820,342 | 6/1974 | Stipanov | 405/83 |
| 3,853,317 | 12/1974 | Braunhut | 273/88 |
| 3,868,324 | 2/1975 | Taylor et al. | 210/158 |
| 3,938,340 | 2/1976 | Downs | 405/83 |
| 4,431,340 | 2/1984 | Truebe et al. | 405/82 |

FOREIGN PATENT DOCUMENTS

| 341427 | 5/1934 | Canada . |
| 371895 | 2/1938 | Canada . |
| 505898 | 9/1954 | Canada . |
| 774834 | 1/1968 | Canada . |

Primary Examiner—Randolph A. Reese
Assistant Examiner—Arlen L. Olsen
Attorney, Agent, or Firm—Browdy & Neimark

[57] ABSTRACT

A device for assisting fish to circumnavigate obstacles such as dams is provided with a system of chambers within each of which is disposed an inclined, water permeable, floating screen movable up and down depending on the level of water in the chamber. The level of water is controlled by a system of strategically located gates and valves. The lowermost chamber is provided with a siphon-like arrangement assisting the draining of the chamber, without the need for a pump. The invention simplifies the overall arrangement and its operation.

9 Claims, 7 Drawing Sheets

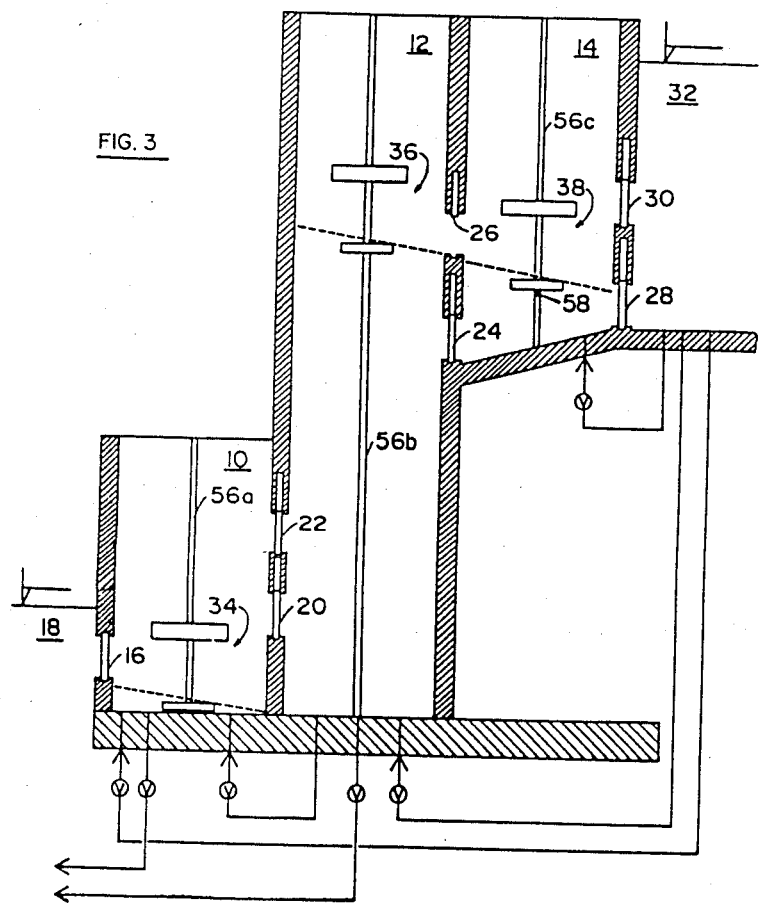

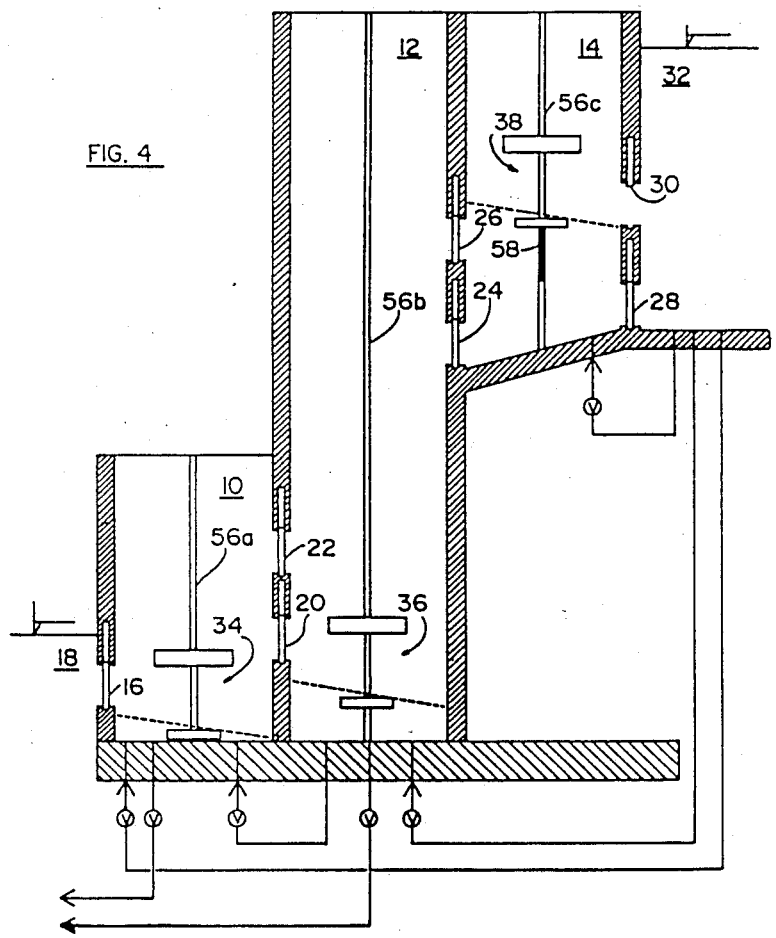

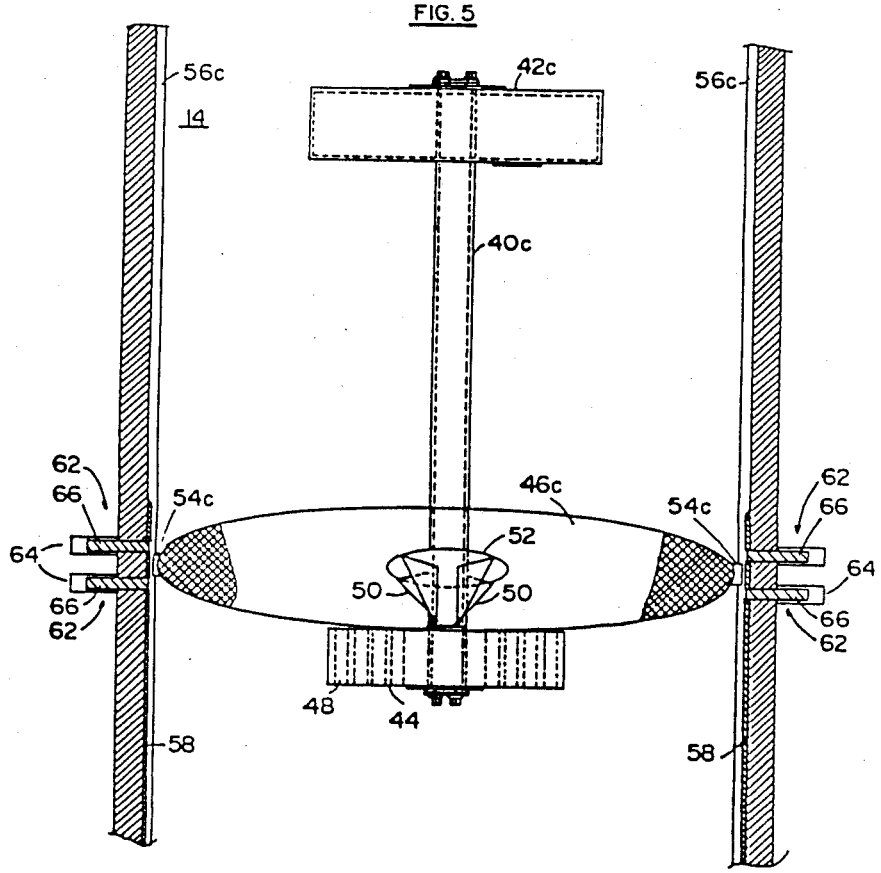

4,904,114

FISH CONVEYING APPARATUS

FIELD OF THE INVENTION

The invention relates to a method and apparatus for assisting fish to overcome and circumnavigate obstructions in rivers and streams.

BACKGROUND OF THE INVENTION

Fish passes, fish locks, or fish elevators have been employed to overcome natural obstacles and man made obstacles such as dams. Fish passes, usually comprising a series of pools of water constructed in the form of steps, have limitations. They are costly to install and must be laid out on a gradual rise, each step limited to the height that the fish are able to naturally overcome. These types of by-passes also require diverting part of the waterflow thereby losing a percentage of the total possible hydro development. In cases of very rugged terrain it is, at times not practical to install these known types of systems and the river is made impassable to the fish.

Various types of fish elevators are also known. These elevators usually comprise a buoyant cage or crowder in which the fish are either raised above or lowered below the obstacle. These elevators have limitations in that they usually require a type of pump to assist in raising or lowering the buoyant case. For example, U.S. Pat. No. 3,377,805 discloses a type of fish elevator wherein an external pressure system is required to supply additionally needed water so as to raise the buoyant cage to the top of the passageway.

SUMMARY OF THE INVENTION

It is an object of the invention to provide a fish conveying device wherein no pump is required to raise the cage means to the level of the upper body of water.

According to a broad aspect, the invention relates to an apparatus for assisting live fish to circumnavigate an obstacle between a downstream portion and an upstream portion of a waterway, said apparatus comprising:

first gate means for closing a first port arranged between a first loading chamber and an adjacent section of the downstream portion of the waterway;

said first port having a lowermost part thereof disposed at a first level which is located below the level of the adjacent section of the downstream portion of the waterway;

a vertically moveable, buoyant first confinement means including a generally planar screen-like first bottom for confining the fish within the first loading chamber;

means to fill said first loading chamber with water to raise the first bottom to a second level disposed above the adjacent section of downstream portion of the waterway;

means for locking said first confinement means in its lower position and in its upper position, wherein said bottom is at or below said first level and at said second level, respectively;

second gate means for closing a second port arranged between said first loading chamber and a substantially vertical passageway;

said second port having a lowermost part thereof disposed at the second level;

a vertically moveable, buoyant second confinement means including a generally planar screen-like second bottom for confining the fish within the said vertical passageway;

means to fill said passageway with water to raise the second bottom to a third level disposed above the second level;

means for locking said second confinement means in its lower position and in its upper position, wherein said bottom is at said second level and at said third level, respectively;

third gate means for closing a third port arranged between said vertical passageway and a second loading chamber;

said third port having a lowermost part thereof disposed at the third level, said third level being disposed vertically above a bottom of said second loading chamber;

a vertically moveable, buoyant third confinement means including a generally planar screen-like third bottom for confining the fish within the said second loading chamber;

means to fill said second loading chamber with water to raise the third bottom to a fourth level disposed near the level of an adjacent section of the upstream portion of the waterway;

means for locking said third confinement means in its lower position and in its upper position, wherein said bottom is at said third level and at said fourth level respectively;

fourth gate means for closing a fourth port arranged between said second loading chamber and said adjacent section of the upstream portion of the waterway;

said fourth port having a lowermost part thereof disposed at the fourth level;

means for selectively draining said loading chambers and passageway.

BRIEF DESCRIPTION OF THE DRAWINGS

The invention is illustrated by way of an example, with reference to the accompanying diagrammatic, simplified drawings in which:

FIG. 3 is the third of said schematic, cross-sectional views;

FIG. 4 is the fourth of said schematic, cross-sectional views;

FIG. 5 is a side view of the first cage means positioned in the first loading chamber;

FIG. 6 is a bottom view of the floating cage of FIG. 5 showing one of the floats associated therewith;

DESCRIPTION OF THE PREFERRED EMBODIMENT

Figure 1:
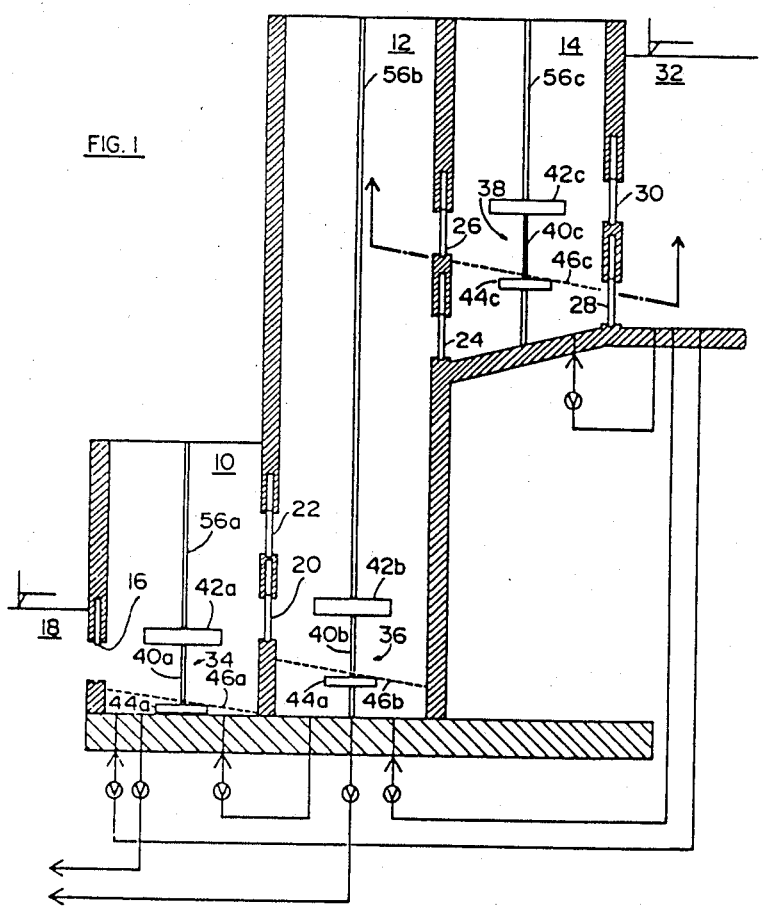
FIG. 1 is the first of four sequential schematic, cross-sectional views of a fish conveying device of the present invention when used for conveying fish from a lower to an upper body of water.

As seen in FIGS. 1 through 4, the fish conveying apparatus comprises a first loading chamber 10, a vertical passageway 12 and second loading chamber 14. A first gate 16 closes the first loading chamber 10 from the lower body 18 of water. The first loading chamber 10 is connected to the vertical passageway 12 by means of a second gate 20 and a seventh gate 22 located above the second gate 20. The vertical passageway 12 is connected to the second loading chamber 14 by means of a sixth gate 24 and a third gate 26 located above the sixth gate 24. A fifth gate 28 and a fourth gate 30 located above said fifth gate 28 connect the second loading chamber 14 to the upper body 32 of water. Gates 16, 20, 26 and 30 are used in an upstream operation of the apparatus while gates 22, 24 and 28 are used in the downstream operation thereof. Therefore, gates 16, 20, 26 and 30 are also referred to as the first, second, third and fourth gates while gates 28, 24 and 22 are also referred to as the fifth, sixth and seventh gates.

Positioned within the first and second loading chambers 10 and 14 and the vertical passageway 12 are floating cages 34, 36 and 38. The cages 34, 36 and 38 being of generally identical structure, their respective components indicated in FIGS. 1–4 are referred to with the same reference numerals corresponding to those in FIG. 6 to which the letters a, b and c have been added corresponding to cages 34, 36 and 38 respectively.

As seen in FIG. 5, each cage comprises a vertical rod 40 whose ends are secured to an upper float 42 and a lower float 44. An inclined screen 46 with an appropriate mesh size is secured to the rod 40 at a position between the floats 42 and 44. The length of the rod 40 is such that, for instance, when the first floating cage 34 is locked in its lowermost position in the first loading chamber 10 as in FIG. 1, the float 42 will be above the water level so as to have no lifting effect on the cage.

The upper float 42 is totally enclosed and thus impermeable.

As seen in FIG. 6, the lower float 44 comprises a matrix of circular apertures 48 therethrough. The apertures 48 are evenly distributed so that the float 44 is balanced. Under regular, unobstructed and unlocked condition, the upper float 42 forming the upper limits of the cage, would rise to the water level in the respective chamber 10 and 14 and passageway 12. The lower float 44 serves to further raise the cage to a point at which the lowermost edge of the screen 46 is level with the water level, at which point the cage can be locked into position.

A gusset 50 and nut and bolt assembly 52 holds the screen 46 at an inclined angle in relation to the horizontal. When the apparatus is used to raise fish from a lower to an upper body of water, the screen 46 is positioned so that it slopes in the direction of the upper body water so as to allow positive unloading of the fish from the first loading chamber 10 to the vertical passageway 12, from the vertical passageway 12 to the second loading chamber 14 and from the second loading chamber 14 to the upper body of water. When the apparatus is used to lower fish, the arrangement of the cages is modified such that the screen 46 slopes in the opposite direction.

Figure 7:
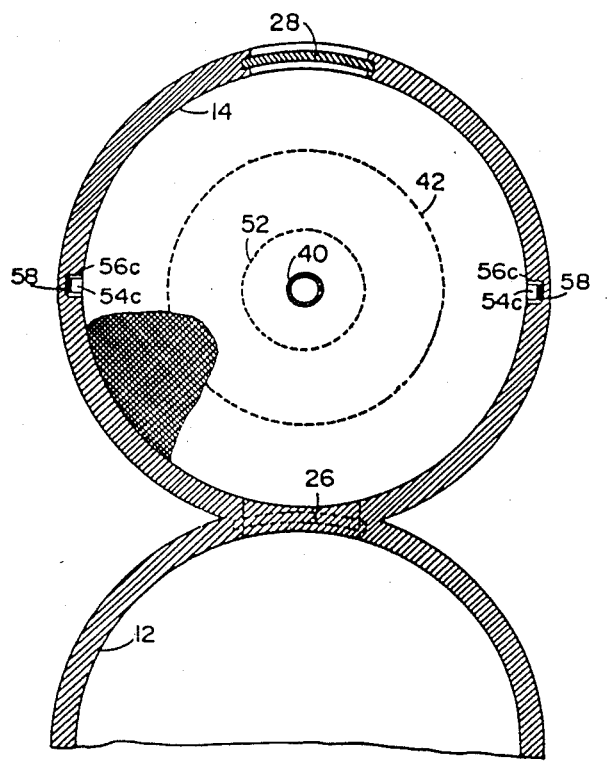
FIG. 7 is a section of the second loading chamber taken along line VII—VII of FIG. 1.

Due to its slope, the screen 46 is ellipsoidal in shape to cover virtually the entire cross-section of the cylindric chambers 10 and 14 and passageway 12. As seen in FIG. 7, in relation to loading chamber 14, the screen has a pair of ferrous tabs 54 at diametrically opposed edges thereof. Channel-shaped vertical metal or plastic guides 56, are fixed to the wall of the loading chambers 10 and 14 and vertical passageway 12 at diametrically opposed locations so as to slidingly engage the tabs 54 of the screen 46, allowing movement of the floating cages 34, 36 and 38 only about a vertical axis. When it is desired to change the direction of the sloping of the screen 46, the floating cages 34, 36 and 38 are removed from their respective chambers 10, 14 and passageway 12 and moved around 180°.

A magnet 58 is fixed to the bottom of each of the respective channels 56c (FIG. 5). The magnet 58 is of the type of a magnetic strip which extends over a length corresponding to the path of travel of the tabs 54c caused by the floating effect of the upper float 42c. The magnetic strips 5B extend over the entire height of the second loading chamber 14 except for a relatively short distance near the top of the second loading loading chamber 14. As the third floating cage 38 rises in the second loading chamber 14, the magnet 58 comes into contact with the tabs 54c. The purpose of the magnetic strips 58 is to retard the raising of the floating cage 38 by a force which virtually eliminates the flotation effect of the lower float 44c until the level of water in the loading chamber 14 (and thus the upper float 42c) has reached the level of the upper body of water. At this point, the magnetic strips 58 terminate allowing the floating force of the lower float 44c to raise the floating cage 38 above the level of the upper body of water to facilitate the unloading of the fish.

As seen in FIG. 5, a pair of hydraulic actuators 62 allows the floating cages 34, 36, and 38 to be locked in a desired position. Each actuator 62 comprises a fixed cylinder end 64 and a movable piston end 66. A pair of openings are provided in the walls of the chambers and passageway. The actuators 62 are fixed to the outside wall of the chambers or passageway at a level such that, when actuated, the piston end 66 of each actuator 62 will extend through the opening in the wall on either side of the upper float 42 of each floating cage thereby locking the floating cage into position.

The first loading chamber 10 is flooded by means of a water supply pipe fed by the upper body of water and/or from water from the drain phase of the vertical passageway 12. The flow of water is controlled by a valve. The system of water supply is well known in the art. Therefore, its components are marked only in a simplified, diagrammatic way. The vertical passageway 12 and the second loading chamber are flooded by means of the water supply pipe referred to above fed by the upper body of water.

Figure 8:
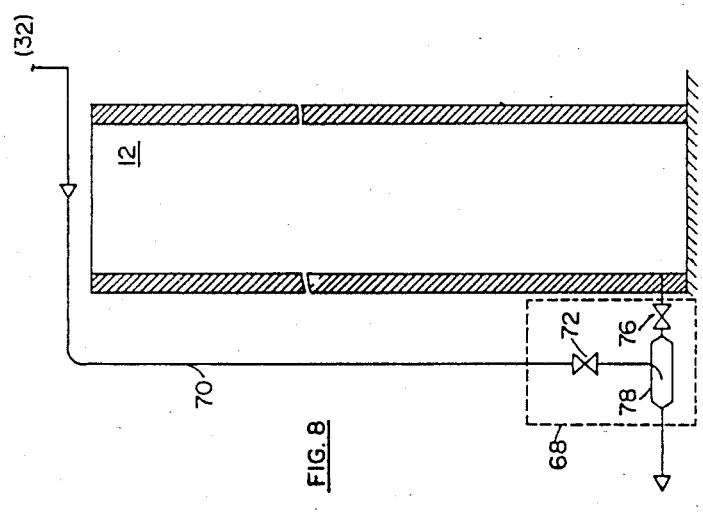
FIG. 8 is a schematic view of the siphon drain system.
Figure 9:
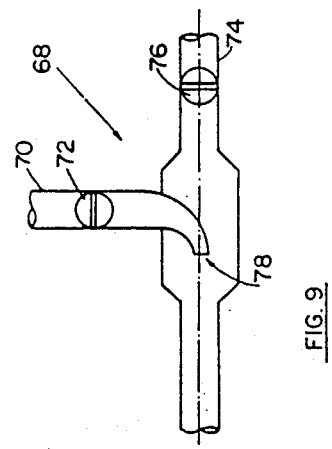
FIG. 9 is detail IX of FIG. 8.

The vertical passageway 12 is drained by means of a siphon drain system 68 illustrated in FIG. 8. The siphon drain system 68 comprises a water conduit 70 carrying water from the upper body 32 of water to the bottom of the vertical passageway 12, a first valve 72 located at the lower end of the conduit 70, a pipe 74 connected to the bottom of the passageway 12 carrying water from the passageway 12 to the lower body of water and a second valve 76 located in said pipe 74 in close proximity to the vertical passageway 12. The conduit 70 and the pipe 74 intersect each other and are connected by means of a Venturi tube 78, as shown in FIG. 9. A siphon drain system 80 (not shown) of identical structure but separate from the siphon drain system 68 is used to drain the first loading chamber 10.

In operation, as seen in FIG. 1, with the first floating cage 34 locked in its lowermost position in the first loading chamber 10, the first gate 16 is opened allowing the fish to enter the first floating cage 34. After a certain amount of fish have accumulated in the floating cage 34 and/or after a certain period of time has elapsed, the first gate 16 is closed sealing off the lower body of water.

Figure 2:
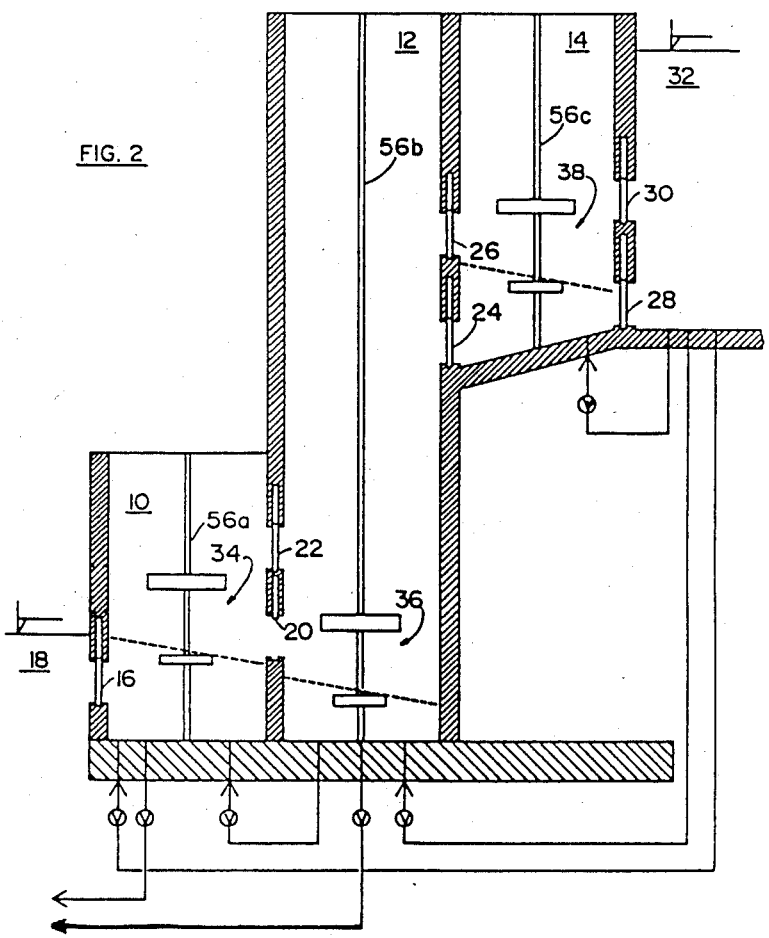
FIG. 2 is the is the second of said four sequential schematic, cross sectional views.

The first loading chamber 10 is flooded by means of the water supply pipe. As seen in FIG. 2, the water rises in the first loading chamber 10 until the first floating cage 34 is aligned with the second gate 20. The first floating cage 34 is then locked in its uppermost position by means of the piston ends 66a of the actuators 62a, as described above with reference to FIG. 6. The second floating cage 36 is at that point locked in position in its lowermost position. The second gate 20 is opened allowing for the positive unloading of the fish from the first floating cage 34 to the second floating cage 36. As mentioned above, the screen is sloped thereby allowing positive unloading of the fish. Once the fish have been unloaded, the second gate 20 is closed.

The vertical passageway 12 is now flooded by means of the water supply pipe referred to above fed by the upper body of water. The water rises in the vertical passageway 12 until the second floating cage 36 is aligned with the third gate 26. The second floating cage 36 is then locked in its uppermost position by means of the piston ends 66b of the actuators 62b. The third floating cage 38 is at that point also locked in its lowermost position by the mechanism of the actuators 62c. The third gate 26 is now opened allowing for the positive unloading of the fish from the second floating cage 36 to the third floating cage 38. Once the fish have been unloaded, the third gate 26 is closed.

The second loading chamber 14 is flooded by means of the water supply pipe. The water rises to the level of the upper body 32 of water. The magnet 58 and the ferrous strip 60 act to slow the ascent of the third floating cage 38 and ensure that the float 44c secured to the lower end of the rod 40c does not function effectively until such time as the float 42 attains the upper water level. When the float 42 has reached the upper body 32 of water, the screen 46 has just cleared the ferrous strip 60. When the fourth gate 30 is opened, the fish is positively unloaded into the upper body of water.

In preparation for the next cycle period, once the fish have been unloaded, the loading chamber 10 and the vertical passageway 12 are drained by means of the siphon drain systems 80 and 68 respectively. By means of example, in order to drain the vertical passageway 12, the second valve 76 is opened causing the water in the said passageway 12 to drain to the level of the lower body 18 of water. The first valve 72 is then opened causing the water in the passageway 12 to drain further to the level of the second gate 20. The first loading chamber 10 is drained in an identical manner by means of the siphon drain system 80. The second loading chamber 14 is drained by means of gravity returning the floating cage 38 to its lowermost position.

Although the operation has been described in conjunction with the raising of fish, the same system, by proper control of the water level and proper positioning of gate means, may be used for the lowering of fish. In operation, the sixth gate 24 and the fifth gate 28 are opened and the second loading chamber 14 drained by gravity allowing the fish to flow directly into the second floating cage 36 maintained at an appropriate level by a further locking mechanism (not shown) similar to the actuators 62, described above. The sixth and fifth gates 24 and 28 are then closed. The vertical passageway 12 is drained by means of gravity to the desired position where the second loading cage 36 is aligned with the seventh gate 22. The seventh gate 22 is opened to allow the fish to be unloaded into the first floating cage 34. The seventh gate 22 is closed. The first loading chamber 10 is drained by means of the siphon drain system 80 bringing the first floating cage 34 to its lowermost position as described above with respect to the siphon drain system 68. The first gate 16 is then opened and fish are unloaded into the lower body 18 of water.

The fish conveying apparatus can also comprise additional gates positioned at various levels or gates capable of multiple openings to accommodate the levels of the lower and upper bodies of water which may vary during the year.

While the present invention has been described in connection with a specific embodiment thereof and a specific use, various modifications will occur to those skilled in the art without departing from the spirit and scope of the invention as set forth in the appended claims. For instance, the drawings and the description refer to two loading chambers and a vertical passageway. The apparatus could comprise only two chambers corresponding to the loading chamber adjacent the downstream portion of the waterway and the vertical passageway. This is but one of many modifications not described but still falling within the scope of the present invention. I therefore wish to embody within the scope of the patent which may be granted hereon all such embodiments as reasonably and properly fall within the scope of my contribution to the art.

The embodiments of the invention in which an exclusive property or privilege is claimed are defined as follows:

1. Apparatus for assisting live fish to circumnavigate an obstacle between a downstream portion and an upstream portion of a waterway, said apparatus comprising:
   first gate means for closing a first port arranged between a first loading chamber and an adjacent section of the downstream portion of the waterway;
   said first port having a lowermost part thereof disposed at a first level which is located below the level of the adjacent section of the downstream portion of the waterway;
   a vertically moveable, buoyant first confinement means including a generally planar screen-like first bottom for confining the fish within a pre-determined region of the first loading chamber;
   means to fill said first loading chamber with water to raise the first bottom to a second level disposed above the adjacent section of downstream portion of the waterway;
   hydraulically actuated means for locking said first confinement means in its lower position and in its upper position, wherein said bottom is at or below said first level and at said second level, respectively;
   second gate means for closing a second port arranged between said first loading chamber and a substantially vertical passageway;
   said second port having a lowermost part thereof disposed at the second level;
   a vertically moveable, buoyant second confinement means including a generally planar screen-like second bottom for confining the fish within a pre-determined region of the said vertical passageway;
   means to fill said passageway with water to raise the second bottom to a third level disposed above the second level;
   means for locking said second confinement means in its lower position and in its upper position, wherein said bottom is at said second level and at said third level, respectively;

third gate means for closing a third port arranged between said vertical passageway and a second loading chamber;

said third port having a lowermost part thereof disposed at the third level, said third level being disposed vertically above a bottom of said second loading chamber;

a vertically moveable, buoyant third confinement means including a generally planar screen-like third bottom for confining the fish within a predetermined region of the said second loading chamber;

means to fill said second loading chamber with water to raise the third bottom to a fourth level disposed near the level of an adjacent section of the upstream portion of the waterway;

means for locking said third confinement means in its lower position and in its upper position, wherein said bottom is at said third level and at said fourth level respectively;

fourth gate means for closing a fourth port arranged between said second loading chamber and said adjacent section of the upstream portion of the waterway;

said fourth port having a lowermost part thereof disposed at the fourth level;

means for selectively draining said loading chambers and passageway.

2. The apparatus of claim 1 further comprising, for circumnavigating the obstacle in a downstream direction:

fifth gate means for closing a fifth port arranged between said adjacent section of the upstream portion of the waterway and said second loading chamber, said fifth port having a lowermost part thereof disposed below said fourth level and generally coincident with the bottom of said second loading chamber;

sixth gate means for closing a sixth port arranged between said second loading chamber and said vertical passageway, said sixth port having a lowermost part thereof disposed at a level below the level of the lowermost part of the fifth port and generally coincident with the bottom of the second loading chamber;

seventh gate means for closing a seventh port arranged between said vertical passageway and said first loading chamber, said seventh port having a lowermost part thereof disposed at a level above the level of an uppermost part of the second port but below the level of the lowermost part of the sixth port.

3. The apparatus of claim 1 wherein the respective buoyant confinement means each comprise an upwardly extending rod having an upper end and a lower end and buoyant means attached to the upper end, a screen forming the respective bottom being fixed to said rod below said buoyant means.

4. The apparatus of claim 3 further comprising an auxiliary buoyant means attached to the rod at the lower end thereof and below said screen.

5. The apparatus of claim 3 wherein the screen of the confinement means is so arranged relative to the axis of the rod that it slopes in a downwardly-and-upstream direction when placed in the respective loading chambers or vertical passageway so as to allow positive unloading of the fish; and guide means for maintaining the screen in one of the downwardly-and-upstream or downwardly-and-downstream directions.

6. Apparatus for assisting live fish to circumnavigate an obstacle between a downstream portion and an upstream portion of a waterway, said apparatus comprising:

primary gate means for closing a primary port arranged between a first chamber and an adjacent section of the downstream portion of the waterway;

said primary port having a lowermost part thereof disposed at a first level which is located below the level of the adjacent section of the downstream portion of the waterway;

a vertically movable, buoyant first confinement means including a generally planar screen-like first bottom for confining the fish within a predetermined region of the first chamber;

means to fill said first chamber with water to raise the first bottom to a second level disposed above the level of the adjacent section of a downstream portion of the waterway;

hydraulically actuated means for lockingly engaging said first confinement means in its lower position and in its upper position, wherein said bottom is at or below said first level and at said second level, respectively;

secondary gate means for closing a secondary port arranged between said first chamber and a second chamber;

said secondary port having a lowermost part thereof disposed at the second level;

a vertically movable, buoyant second confinement means including a generally planar screen-like second bottom for confining the fish within a predetermined region of the said second chamber;

means to fill said second chamber with water to raise the second bottom to a third level disposed near the level of an adjacent section of the upstream portion of the waterway;

means for locking said second confinement means in its lower position and in its upper position, wherein said bottom is at said second level and at said third level, respectively;

tertiary gate means for closing a third port arranged between said second chamber and said adjacent section of the upstream portion of the waterway;

said tertiary port having a lowermost part thereof disposed at the third level; and means for selectively draining said first and second chambers.

7. The apparatus of claim 6 wherein the respective buoyant confinement means each comprise an upwardly extending rod having an upper end and a lower end and buoyant means attached to the upper end, a screen forming the respective bottom being fixed to said rod below said buoyant means.

8. The apparatus in claim 7 further comprising an auxiliary buoyant means attached to the rod at the lower end thereof and below said screen.

9. The apparatus of claim 7 wherein the screen of the confinement means is so arranged relative to the axis of the rod that it slopes in a downwardly and upstream direction when placed in the respective chambers so as to allow positive unloading of the fish; and guide means for maintaining the screen in one Of the downwardly and upstream or downwardly and downstream directions.

* * * * *